United States Patent Office 3,719,689
Patented Mar. 6, 1973

3,719,689
ALPHA,ALPHA-DIHALO-BETA-LACTONES
Donald A. Reich, Barberton, and Henry C. Stevens, Akron, Ohio, assignors to PPG Industries, Inc., Pittsburgh, Pa.
No Drawing. Continuation of application Ser. No. 660,617, Aug. 15, 1967, which is a continuation-in-part of application Ser. No. 547,412, May 4, 1966. This application Mar. 26, 1970, Ser. No. 20,478
Int. Cl. C07d 3/00
U.S. Cl. 260—343.9
2 Claims

ABSTRACT OF THE DISCLOSURE

Alpha,alpha-dihalo-beta-lactones are prepared by reacting a dihaloketene with a carbonyl compound, optionally in the presence of a solvent. The lactones can be polymerized to yield polyesters.

CROSS-REFERENCE TO RELATED APPLICATIONS

This application is a streamlined continuation of our earlier copending application, U.S. Ser. No. 660,617, filed Aug. 15, 1967, now abandoned, which was a continuation-in-part of our application, U.S. Ser. No. 547,412, filed May 4, 1966, in the names of Donald A. Reich and Henry C. Stevens, and now abandoned.

BACKGROUND OF THE INVENTION

It is known that beta-lactones can be prepared by the reaction between ketene and an organic carbonyl compound. See, for example U.S. Letters Pat. 2,450,116. In general, these reactions must be conducted in the presence of catalysts in order to proceed. Substituted beta-lactones described in the prior art have heretofore been mostly limited to the lower alkyl-substituted lactones. Moreover, most of the substituted beta-lactones previously described in the literature have substituents occurring on the beta-carbon rather than on the alpha-carbon.

BRIEF SUMMARY OF THE INVENTION

This invention relates to a method for the preparation of alpha,alpha-dihalo-beta-lactones and to the lactones produced thereby. In particular, this invention relates to the preparation of alpha,alpha-dihalo-beta-lactones by the reaction of an alpha,alpha-dihaloketene and an organic carbonyl compound. More particularly, this invention relates to the preparation of alpha,alpha-dichloro-beta-lactones by the reaction of alpha,alpha-dichloroketene and an organic carbonyl compound.

It has now been discovered that a new class of beta-lactones, i.e., alpha,alpha-dihalo substituted beta-lactones, can be prepared without the use of catalysts by the reaction between a dihaloketene and an organic carbonyl compound. In a particular embodiment of the present method, the dihaloketene is generated in the presence of the organic carbonyl compound by the reaction between a suitable dihaloacetyl halide and a tertiary amine.

DETAILED DESCRIPTION

The dihaloketenes employed in the present method are, in general, those ketenes represented by the following formula:

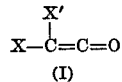

(I)

wherein X and X' are halogen and are each selected from the group consisting of fluorine, chlorine, bromine, and iodine. Preferably, X and X' are the same and are chlorine or bromine. The dihaloketenes depicted by the above general Formula 1 can be prepared by any known method. Suitably, they are prepared by reacting a dihaloacetyl halide and a tertiary amine in a chemically inert solvent. Another method for preparing said dihaloketenes is by the dehalogenation of trihaloacetyl halides with zinc or zinc activated with copper.

Preparation of dihaloketenes by the first of the two methods recited hereinabove has been described in co-pending, co-assigned U.S. Patent application, Ser. No. 221,337, filed Sept. 4, 1962, now abandoned. Accordingly, that application is incorporated herein in toto by reference and only so much of that disclosure as is necessary to understand the particular embodiments of the present invention will be reiterated hereinafter.

The reaction of a dihaloacetyl halide and a tertiary amine in a chemically inert solvent yields the corresponding tertiary amine hydrohalide and dihaloketene. In general, tertiary amines employed to generate dihaloketenes in accordance with the aforementioned method are free from other functional groups and soluble in the solvent chosen as the reaction medium. Moreover, it is preferred that the tertiary amine forms relatively insoluble hydrohalides in the reaction medium. While the simple aliphatic tertiary amines are most preferred for generating dihaloketenes, any suitable tertiary (as defined above) amine can be emloyed. Thus, ditertiary amines, such as tetramethyldiaminoethane, and cyclic amines, such as pyridine and derivatives thereof, can also be employed.

Aliphatic tertiary amines which can suitably be employed can be depicted by the following formula:

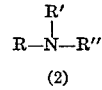

(2)

wherein R, R' and R" are each selected from the group consisting of $C_1$–$C_{10}$ alkyl, preferably $C_1$–$C_5$ alkyl.

Suitable examples of various tertiary amines include: trimethylamine, triethylamine, tri-n-propylamine, tri-n-butylamine, tri-n-octylamine, methyldiethylamine, methylethyl-n-propylamine, triisopropylamine, dimethylisopropylamine, dimethylbutylamine, dimethylisoamylamine, dimethylisooctylamine, dimethyloctylamine, methylethylisooctylamine, dimethyl-(2-ethyl)-propylamine, dimethyl-t-butylamine, dimethyloctadecylamine, pyridine, lutidine, piperidine, collidine, picoline, N-methylmorpholine, N-methylpiperidine, N,N'-dimethylpiperazine, quinoline, dimethylaniline, and dimethylaminoethylpropionate. Preferably, the simple tertiary aliphatic amines such as triethylamine, are used.

Dihaloacetyl halides employed in conjunction with the above-described tertiary amines are, in general, compounds represented by the following formula:

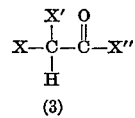

(3)

wherein X, X' and X" are halogens, i.e., fluorine, chlorine, bromine, and iodine, and can be the same or different. Preferably, X, X' and X" are the same and are selected from the group consisting of chlorine and bromine.

Suitable examples of dihaloacetyl halides include: difluoroacetyl fluoride, dichloroacetyl chloride, difluoroacetyl chloride, difluoroacetyl bromide, fluorochloroacetyl chloride, fluorochloroacetyl bromide, fluorobromoacetyl fluoride, fluorobromoacetyl chloride, fluorobromoacetyl bromide, dibromoacetyl fluoride, dibromoacetyl chloride, dibromoacetyl bromide, chlorobromoacetyl fluoride, chlorobromoacetyl chloride, chlorobromoacetyl bromide, and chloroiodoacetyl chloride. Dichloroacetyl chloride is preferred.

The mole ratio of tertiary amine to dihaloacetyl halide in the above-described reaction is generally about 1:1, e.g., between about 0.9:1 and about 1.05:1.

The reaction between the tertiary amine and dihaloacetyl halide is performed in the presence of a chemically inert, anhydrous solvent which is preferably also a non-solvent for the by-product amine hydrohalide. To be considered inert, the solvent should contain no functional groups that react with carbonyl groups, tertiary amines, dihaloacetyl halides, and dihaloketenes. Unsuitable solvents are those containing hydroxyl and/or carboxyl groups or an active hydrogen, i.e., a hydrogen attached to an oxygen, sulphur, or nitrogen atom. The amount of solvent employed can vary over a wide range; but, in general, should be about three times as great by weight as the tertiary amine hydrohalide by-product in order to facilitate agitation of the reaction medium.

Examples of suitable solvents include: $C_4$–$C_{20}$ aliphatic hydrocarbons, and chlorinated aliphatic hydrocarbons, $C_4$–$C_{12}$ alicyclics, $C_6$–$C_{10}$ aromatics, and chlorinated aromatics, ethers, and esters. Specific examples of the above include: n-butane, isobutane, pentane, hexane, isopentane, n-heptane, 2,2,3-trimethylbutane, n-octane, dodecane, pentadecane, eicosane, preferably, pentane and hexane; cyclobutane, methylcyclopropane, cyclopentane, cyclohexane, cyclododecane; benzene, toluene, o-xylene, m-xylene, p-xylene, ethylbenzene, n-propylbenzene, isopropylbenzene, p-isopropyl-toluene, 1,2,3-trimethylbenzene, 1,2,4-trimethylbenzene, 1,3,5-trimethylbenzene, tetrahydronaphthalene, decahydronaphthalene, 1,4-dioxane, 1,3-dioxane, 1,3-dioxolane, tetrahydrofuran, 2-methyl-tetrahydrofuran, methylpropylether, di-n-propylether, di-n-butylether, diisopropylether, ethyl-n-butylether, diethylether; $C_1$–$C_4$ alkyl esters of $C_1$–$C_8$ carboxylic acids, such as, methylacetate, propylacetate, butylacetate, ethylpropionate, methylbutyrate, methyl heptanoate, ethyl benzoate, dimethyl phthalate; carbon tetrachloride, chloroform, perchloroethylene, dichlorodifluoromethane, trichloroethylene, methylene chloride, 1,1,1-trichloroethane, 1,2-dichloroethane, o-dichlorobenzene, hexafluorobenzene, monochlorobenzene, and 1,2,4-trichlorobenzene.

The temperature at which the dihaloketenes are prepared in the above-described embodiment can vary over a wide range and, in general, will depend to a great extent on the solvent employed. Generally, temperatures between about −50° C. and about 100° C. are employed. Preferably, temperatures between about −20° C. and about 50° C., more preferably between about 0° C. and about 30° C. are utilized.

The pressure at which the reaction between the dihaloacetyl halide and tertiary amine is performed will depend to a great extent upon the volatility of the solvent and reactants employed. In general, these reactions can be conducted at normal atmospheric pressure. In a few instances, where the reactants and/or solvent have low boiling points, superatmospheric pressures can be employed, e.g., between about 1 and about 3 atmospheres. If desired, pressure less than atmospheric can be utilized so long as the reactants remain in the liquid state.

The alpha,alpha-dihalo-beta-lactones of the present invention are prepared by reacting a dihaloketene, prepared, for example, by the above-described procedure, with an organic carbonyl compound.

The organic carbonyl compounds which can be employed to prepare the lactones of the present invention are, in general, any organic compound containing one or more carbonyl groups as the primary functional group. Typically, said organic carbonyls are represented by aldehydes, ketones, diketones, quinones, and keto carboxylic acid esters. Of particular utility in the present process are aldehyde, ketones and alpha,alpha-dihalo cyclobutanones derived from saturated hydrocarbons, e.g., paraffins. Preferably, the organic carbonyl compound is of the aldehyde variety. In general, ethylenically unsaturated open-chain carbonyl compounds are to be avoided due to the possibility of addition of the dihaloketene across the double bond. However, cyclic systems, e.g., aromatic, heterocyclic and alicyclic carbonyl compounds (saturated and unsaturated) have been found to be quite suitable. While not intending to be limited thereby, organic carbonyl compounds which can be employed to prepare the lactones of the present invention can be represented by the following general formulae:

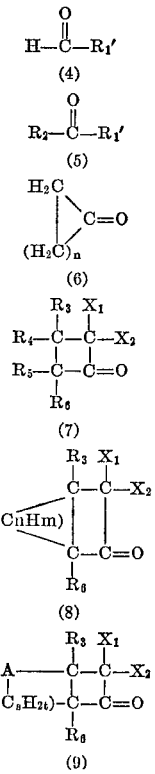

wherein $R_1$, $R_1'$, $R_2$, $R_3$, $R_4$, $R_5$, and $R_6$ are each selected from the group consisting of hydrogen, $C_1$–$C_{20}$ branched and straight-chain alkyl, e.g., methyl, ethyl, propyl, isopropyl, butyl, isobutyl, pentyl, hexyl, heptyl, octyl, decyl, dodecyl, hexadecyl, and eicosyl; halogenated $C_1$–$C_{20}$ alkyls, e.g., chloromethyl, 1-bromoethyl, trichloromethyl, and fluoromethyl; $C_3$–$C_{12}$ cycloalkyl, e.g., cyclopropyl, cyclobutyl, cyclopentyl, cyclohexyl, cyclooctyl, cyclodecyl, and cyclododecyl; $C_6$–$C_{12}$ aryl, e.g., phenyl, benzyl, o,m,p-tolyl, xylyl, and naphthyl; and mono-, di-, and trisubstituted $C_6$–$C_{12}$ aryls, e.g., carboxy, nitro, cyano, $C_1$–$C_6$ alkoxy, $C_2$–$C_4$ alkyl, phenyloxy, and halo-substituted aryls; $n$ is a cardinal number of from 1 to 10, preferably 2 to 5; $m$ is equal to $2n$ or $2n-2$; A is oxygen, sulfur, or methylene ($-CH_2-$); $s$ is a cardinal number of from 1 to 9, preferably, 1 to 5; $t$ is equal to $2s$ or $2s-2$; and $X_1$ and $X_2$ are halogen, e.g., fluorine, chlorine, bromine, and iodine. Preferably, $R_1$, $R_1'$, $R_2$, $R_3$, $R_4$, $R_5$, and $R_6$ are each selected from the group consisting of hydrogen, $C_1$–$C_{10}$ alkyl, $C_4$–$C_6$ cycloalkyl, $C_6$–$C_9$ aryl, and halo-substituted $C_6$–$C_9$ aryls, and more preferably are $C_1$–$C_5$ alkyls.

Specific examples of carbonyl compounds include: formaldehyde, acetaldehyde, propionaldehyde, n-butyraldehyde, n-valeraldehyde, n-caproaldehyde, heptanal, chloral, isopropionaldehyde, isobutyraldehyde, undecanal, dodecanal, dodecanedial, hexadecanal, octadecanal, benzaldehyde, p-tolualdehyde, cyclopentyl formaldehyde, cyclopentyl acetaldehyde, cyclohexyl formaldehyde, 1-naphthaldehyde, p-carboxybenzaldehyde, p-nitrobenzaldehyde, p-cyanobenzaldehyde, m-ethoxybenzaldehyde, 2,4-dimethylbenzaldehyde, o-chlorobenzaldehyde, m-bromobenzaldehyde; p-fluorobenzaldehyde, acetone, 2-butanone, 2-pentanone, 3-pentanone, 2-methyl-butan-3-one, 4-heptanone, 2-hexanone, 3- hexanone, 1,1-dichloro-2-propanone, chloroacetone, bromoacetone, acetyl acetone, acetonyl acetone, 1-cyclohexyl-1-propanone, 1-cyclohexyl-2-methyl-1-propanone, 1-cyclopentyl-1-ethanone, cyclohexanone, acetophenone, diphenylketone, ethyl tolyl ketone, 4'-nitroacetophenone, o-methylphenyl octyl ketone, methyl naphthyl ketone, 4'-bromo-2-chloroacetophenone, 5',6',7',8'-tetrahydro-2'-butyronaphthone, 3'-nitro-octanophenone, 2-phenyl-cyclopropanone, cyclopentanone, 2,2-dichlorocyclobutanone, 2,2-dichloro-3,3,4,4-tetramethylcyclobutanone, 2,2-dibromo-3-phenylcyclobutanone, 2,2-dichloro-2-methyl - 2 - ethylcyclobutanone, 7,7-dichloro-bicyclo [3.2.0]-heptan-6-one, 7,7-dichloro-bicyclo[3.2.0]-2-hepten-6-one, 8,8-dibromobicyclo[4.2.0]-octan-7-one, 8,8-dichloro-bicyclo[4.2.0]-2-oxa-octan-7-one, 7,7-dichloro-bicyclo[3.2.0]-2-thia-3-hepten-6-one, 7,7-dichloro-bicyclo-[3.2.0]-2-oxa-3-hepten - 6 - one, nicotinaldehyde, 1-(2-furyl)-1-butanone, 1-(5-quinolyl)-1-pentanone, p-benzoquinone, o-benzoquinone, diphenoquinone, 1,4-naphthoquinone, m-xyloquinone, quinone dibromide, trichloroquinone, and chloranil.

The alpha,alpha-dihalocyclobutanones depicted hereinabove by Formulae 7–9 can be prepared by the reaction of a dihaloketene and an olefin. The olefins that can be utilized include a variety of olefinic compounds and, in general, encompass compounds containing a vinyl group ($CH_2=C<$) or vinylene group ($-CH=CH-$) as part of an aliphatic, alicyclic, aromatic or heterocyclic compound. Representative categories of such compounds include: $C_2-C_{20}$ aliphatic monoolefins, $C_4-C_8$ alicyclic monoolefins and diolefins, $C_2-C_6$ alkenyl-substituted aromatics, vinyl ethers, vinyl esters, etc.

Specific examples of typical olefins include: ethylene, propylene, 1-butene, 2-butene, isobutylene, 1-pentene, 2-pentene, 2-methyl-2-butene, 1-hexene, 3-hexene, 3-methyl-1-pentene, 2-methyl-2-pentene, 2,3-dimethyl-2-butene, 2,4,4-trimethyl-1-pentene, 1-octene, decene, dodecene, pentadecene, octadecene, and eicosene; cyclobutene, cyclopentene, cyclohexene, 3-methylcyclopentene, 4-methylcyclopentene, 3-methylcyclohexene, 3,4-dimethylcyclohexene; cyclopentadiene, styrene, allylbenzene, butenyl benzene and vinyl toluene; vinyl acetate, vinyl propionate, vinyl butyrate, vinyl valerate, vinyl caproate, and vinyl caprate; methyl vinyl ether, ethyl vinyl ether, propyl vinyl ether, butyl vinyl ether, dihydrofuran, and dihydropyran.

A suitable method for the preparation of alpha,alpha-dihalocyclobutanones is adequately described in copending, co-assigned U.S. patent application, Ser. No. 221,337, filed Sept. 4, 1962, now abandoned which has hereinabove been incorporated by reference. In general, the process described in that application for preparing alpha, alpha-dihalocyclobutanones comprises generating a dihaloketene in the presence of an olefin.

The preparation of dihaloketenes has been discussed hereinabove and that discussion is applicable here. The mole ratio of olefin to dihaloacetyl halide in the preparation of alpha,alpha-dihalocyclobutanones can vary over a wide range and preferably will vary between about 0.9:1 and about 10:1, more preferably between about 2:1 and about 5:1. The temperatures at which the aforementioned cyclobutanones are prepared can vary broadly and, in general, vary between about $-20°$ C. and about 50° C., preferably between about 0° C. and about 30° C. Reaction pressures will generally be atmospheric or autogenous. Any of the solvents described hereinabove with respect to the preparation of the dihaloketenes likewise can be employed for the preparation of the alpha-alpha-dihalocyclobutanones.

The alpha,alpha-dihalo-beta-lactones of the present invention are prepared by the reaction of a dihaloketene and an organic carbonyl compound. For example, a dihaloketene, e.g., dichloroketene, can be generated in a suitable reaction vessel by any available means, e.g., by the method described hereinabove, separated or kept in solution, and then further reacted with an organic carbonyl compound. In a particular embodiment, the dihaloketene is generated in the presence of the organic carbonyl compound and reacted in situ with said carbonyl compound. In another embodiment, the dihaloketene is reacted with an olefin to form a dihalocyclobutanone which then reacts with another mole of dihaloketene to yield the beta-lactone of the present invention.

The temperature at which the beta-lactones of the present process man be prepared varies and depends to a great extent on the reactants employed. In general, the temperature can vary between about $-60°$ C. and about $+100°$ C., preferably between about $-30°$ C. and about $+30°$ C. Pressures employed depend to a great extent upon the volatility of the reactants and solvent. Typically, the reaction will be conducted at atmospheric pressure. In those instances where the reactants and/or solvent have low boiling points, superatmospheric pressures, e.g., between about 1 and about 3 atmospheres, can be utilized. The mole ratio of organic carbonyl compound to dihaloketene can vary over a wide range and, in general, will vary between about 0.9:1 and about 20:1, preferably, between about 1:1 and about 10:1.

Solvents which optionally can be employed in the preparation of the beta-lactones of the present process should, in general, be chemically inert and liquid at the reaction temperature. By chemically inert is meant that the solvent is non-reactive towards any of the reactants or products formed during the preparation of the beta-lactones under the conditions of preparation. Any of the solvents described hereinabove with respect to the preparation of the dihaloketenes can be employed for the preparation of the beta-lactones.

The alpha,alpha-dihalo-beta-lactones prepared in accordance with the present process can be represented by the general grouping,

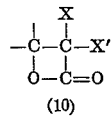

(10)

wherein X and X' are each halogen (fluorine, chlorine, bromine and iodine) and can be the same or different. The two unconnected bonds attached to the beta-carbon atom can be associated with hydrogen and/or alkyl groups, or can form a part of an alicyclic, heterocyclic, or bicyclic spiro system. In addition, these bonds can form a part of a spiro-lactone structure, such as formed by the condensation of 2 moles of a dihaloketene with one mole of an organic carbonyl compound. These spiro-lactones can be represented by the general grouping,

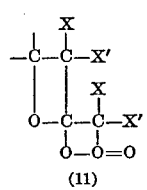

(11)

While not intending to be limited thereby, examples of general formulae depicting representative alpha, alpha-dihalo-beta-lactones prepared in accordance with the present invention are as follows:

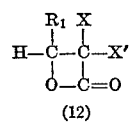

(12)

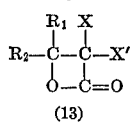
(13)

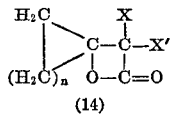
(14)

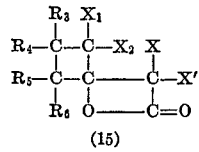
(15)

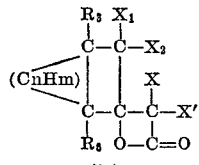
(16)

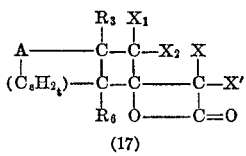
(17)

wherein $R_1$–$R_6$ are hydrogen, hydrocarbon radicals or substituted hydrocarbon radicals; A is oxygen, sulfur or methylene; X, X', $X_1$ and $X_2$ are halogens; and $s$, $t$, $n$, and $m$ are cardinal numbers. All of the aforementioned symbols and terms have been defined previously with respect to the description of the organic carbonyl compounds, and the dihaloketenes. Those definitions are equally applicable here and are incorporated by reference.

The beta-lactones of the present process can be hydrolyzed to the corresponding beta-hydroxy acid. Both the acid and lactone are useful as chemical intermediates. Treatment of the lactone with an aqueous solution of an alkali salt, e.g., sodium chloride and sodium acetate, gives the alkali salt of the corresponding β-substituted propionic acid. The 2,4-dichlorophenol ester may be prepared from the dichlorohydroxy acid by known methods. The alkali salts and alkoxy esters are also useful as chemical intermediates. The aryloxy esters, especially the 2,4-dichlorophenoxy esters, are useful as chemical intermediates for the manufacture of agricultural chemicals, especially herbicides. Both the beta-hydroxy acids derived from hydrolysis of the beta-lactones, and the beta-lactones per se, can be heated with and without catalysts to yield a linear polyester. The polyesters are chain-like and, depending on the degree of polymerization and their individual components, range from viscous liquids to solids. These polyesters are characterized by the repeating structural unit

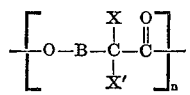

wherein $n$ is a cardinal number representing the number of repeating units, e.g., 2 to 20, X and X' represent the halogens that were appended to the alpha carbon atom of the lactone or acid polymerized, and B represents the beta carbon atom of the lactone or acid and any substituent atom, e.g., hydrogen or group, e.g., methyl. For example, where the lactone is alpha,alpha-dihalo-beta-propiolactone, B is —$CH_2$—. Similarly, where the lactone is alpha,alpha-dihalo-beta-methyl-beta-propiolactone, B is $$-\underset{\underset{CH_3}{|}}{CH}-$$

The aforementioned polyesters have various applications and can be employed in a conventional manner depending on the molecular weight. For example, they can be employed as surface coatings where the chlorine content will impart flame resistance.

In addition, the alpha,alpha-dihalo-beta-lactones of the present invention can be catalytically polymerized in the presence of small amounts of a difunctional, active-hydrogen compound to yield a hydroxyl terminated polyester. Such polyester can be further reacted with a diisocyanate to yield a urethane elastomer which can be cured with conventional sulfur cure recipes to yield elastomeric compositions useful in the field of foams, coatings, and leather substitutes. Moreover, the beta-lactones of the present invention can be condensed with imines, such as ethylene imine or its homologs to yield polymeric products useful as coatings or as resinous compositions in paint formulations.

In the preparation of the above-recited hydroxyl terminated polyesters, any difunctional, active-hydrogen compound can be used. Examples thereof include: ethylene glycol, hexamethylene diamine, and monoethanolamine. These compounds act as chain terminators and, therefore, the amount used in the polymerization of the beta-lactones hereof depends on the polyester chain length desired, i.e., the less chain terminator used, the longer the chain. Generally, the mole ratio of beta-lactone to active-hydrogen compound, e.g., ethylene glycol, is greater than one and is indicative of the number of repeating units obtained in the polyester.

The catalyst used to prepare the hydroxyl-terminated polyesters described above is typically a basic catalyst and preferably is a salt of a weak acid and strong base. Examples thereof are the lithium, sodium, and potassium salts of metaphosphoric, stannic, boric, and carboxylic acids such as formic, acetic, carbonic, and benzoic acid. Of particular utility is potassium carbonate.

Temperatures at which the hydroxyl-terminated polyesters are prepared can vary from −80° C. to +150° C., more often from −20° C. to +100° C. Generally, the higher temperatures are used for the beta-lactones which are more difficult to polymerize, i.e., those which are di-substituted on the beta carbon atom. Polymerization pressures are typically atmospheric or autogenous. Solvents useful in the above-described polymerization process are non-polar solvents such as aliphatic, cycloaliphatic, and aromatic hydrocarbons and chlorinated hydrocarbons, e.g., hexane, pentane, mixed branched octanes, dimethyl hexane, benzene, toluene, tetralin, chlorobenzene, and cyclohexane; and ethers such as ethyl ether, diisopropyl ether, and tetrahydrofuran.

The common utility of the alpha,alpha-dihalo-beta-lactones of the present invention results from the common presence of the beta-lactone structure and the strong tendency for reactions to initiate by cleavage at the carbonyl-oxygen bond or at the alkyl-oxygen bond. Substituent groups on the beta-carbon atom of the beta-lactones are generally less likely to undergo reaction initially due to the beta-lactone structure which is highly reactive due to the strained nature of the four-membered ring.

The present process and compounds produced thereby are more particularly described in the following examples which are intended as illustrative only since numerous modifications and variations will be apparent to those skilled in the art.

EXAMPLE I

A three-liter, four-necked resin flask, equipped with two addition funnels, thermometer, mechanical stirrer, reflux condenser and an inlet for a nitrogen gas sweep through the reactor vapor space was charged with 700 ml. of n-hexane and chilled to about 0° C. Then, seven moles (400 ml.) of acetaldehyde were charged to the resin flask to form an acetaldehyde-hexane solution. Separate three hundred milliliter solutions of an acid chloride and an amine were prepared by dissolving 101.5 grams (0.688 mole) of dichloroacetyl chloride in 200 ml. of n-hexane and 69.5 grams (0.688 mole) of triethylamine in 200 ml. of n-hexane. Then the acid chloride and amine solutions were fed simultaneously at equal rates to the resin flask over a period of 1¼ hours through separate addition funnels. A nitrogen sweep was maintained during the addition of the reactants, and the temperature of the flask held at about 5° C.

Upon completion of the addition of the acid chloride and amine solutions to the resin flask, 100 ml. of fresh n-hexane was added through the addition funnels. Unreacted acetaldehyde from the reaction mixture was removed from the reaction mixture by the use of a water aspirator and then the reaction mixture was filtered. The filtrate was evaporated using a rotary film evaporator, a water aspirator and a warm water bath to yield a reddish colored liquid reaction product. Reduced pressure distillation of the product yielded a slightly colored volatile liquid having a boiling point of about 40–45° C. at 0.1 mm. Hg.

The volatile product had a chlorine content of 45.1 percent. The calculated chlorine content for a 1:1 dichloroketene:acetaldehyde adduct is 45.8 percent. Infrared and Nuclear Magnetic Resonance (NMR) spectra in conjunction with elemental analysis of the product confirm a beta-lactone structure and confirm that the product is the result of an equimolar combination of dichloroketene and acetaldehyde. The 1:1 adduct product may be named alpha,alpha-dichloro-beta-methyl-beta-propiolactone and, therefore, is believed to be represented by the structural formula:

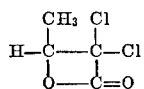

Analysis of the non-volatile distillation residue showed it to have a chlorine content of 52.3 percent. The calculated chlorine content for a 2:1 dichloroketene:acetaldehyde adduct is 52.3 percent. Infra-red and NMR spectra in conjunction with elemental analysis confirm that the product is a mixture of isomers resulting from the reaction of 2 moles of dichloroketene with 1 mole of acetaldehyde and also confirm a spiro-lactone structure. These spiro-lactone products may be named (a) 1,1,7,7-tetrachloro-3,5-dioxa-6-methyl spiro[3.3] - heptane-2-one and (b) 1,1,7,7-tetrachloro-3,6-dioxa-5-methyl spiro[3.3] heptane-2-one and, therefore, are believed to be represented by the following structural formulae:

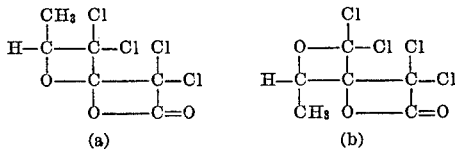

(a)           (b)

Isomer (a) is believed to be the predominant isomer of the two.

EXAMPLE II

The procedure of Example I is repeated with formaldehyde, propionaldehyde, butyraldehyde, benzaldehyde, acetone, cyclohexanone, and 2-butanone and the corresponding 1:1 dichloroketene:carbonyl compound additive, i.e. alpha,alpha-dichloro-beta-lactones, are found to have been produced.

EXAMPLE III

Employing the equipment of Example I, 102.0 grams (0.692 mole) of dichloroacetyl chloride were added to one liter of n-hexane in the reaction flask and the solution chilled to about 0° C. A solution of 70.0 grams (0.692 mole) of triethylamine and 485.0 grams (6.74 moles) of vinyl ethyl ether was then added over 3½ hours to the reaction flask. The reactants were held at a temperature of about 0–3° C. during the course of addition. The crude reaction product was filtered and the filtrate subjected to reduced pressure fractionation. A light yellow liquid having a boiling point of 115–125° C. at 1 mm. of mercury was recovered. This yellow liquid had a chlorine content of 48.8 percent. The calculated chlorine content for the 2:1 dichloroketene:vinyl ethyl ether adduct is 48.3 percent. Infrared and NMR spectra together with elemental analysis confirm the product to be the reaction product of 2 moles of dichloroketene with 1 mole of vinyl ethyl ether and confirm a spiro-lactone structure. This product may be named 1,1,7,7-tetrachloro-3-oxa-6-ethoxy spiro[3.3]heptane-2-one and, therefore, is believed to be represented by the following structural formula:

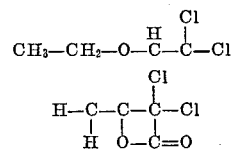

EXAMPLE IV

The procedure and equipment of Example I were employed in the following manner. The reaction flask was charged with a solution of 31.0 grams (0.210 mole) of dichloroacetyl chloride, 33.0 grams (0.393 mole) of dihydropyran, and 200 ml. of n-hexane. A solution of 20.0 grams (0.198 mole) of triethylamine in 200 ml. of n-hexane was then added to the reaction flask over a period of about 1⅓ hours. Reaction temperature was held at 3–4° C. Filtration of the crude product yielded an orange filtrate. Reduced pressure distillation (1 mm. Hg) yielded a liquid boiling at 130° C./1 mm. Hg. This liquid distillate had a chlorine content of 47.0 percent. The calculated chlorine content for a 2:1 dichloroketene:dihydropyran adduct is 46.4 percent. Infrared and NMR spectra, together with elemental analysis confirm the product to be the result of the combination of 2 moles of dichloroketene with 1 mole of dihydropyran and confirm a spiro-lactone structure. Such analytical procedures indicate the presence of two isomers which are believed to be represented by the following structural formulae:

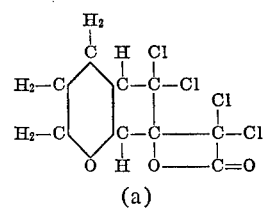

(a)

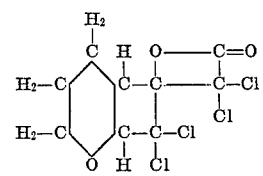

(b)

and, therefore, named (a) 1,1,7,7-tetrachloro-3-oxa-5,6-tetrahydropyrano-2',3'-spiro[3.3]heptane-2-one and (b) 1,1,7,7 - tetrachloro-3-oxa - 5,6 - tetrahydropyrano-3',2'-spiro[3.3]heptane-2-one.

EXAMPLE V

In an analogous manner to Example I, 99.5 grams (0.675 mole) of dichloroacetyl chloride, and 627.5 grams (6.02 moles) of styrene were charged to the reaction flask. Thereafter, a solution of 68.0 grams (0.675 mole) of triethylamine and 272.5 grams (2.62 moles) of styrene were added to the contents of the flask over a period of 2.2 hours. The temperature of the reactants was held at about 59° C. The reaction product was filtered and the filtrate, a dark, reddish liquid, dissolved in carbon tetrachloride and subjected to partial fractionation with petroleum ether. The less soluble components precipitated and the remainder was soluble in the carbon tetrachloride-petroleum ether solution. This portion of the filtrate had a chlorine content of 42.9 percent. The calculated chlorine content for a 2:1 dichloroketene:styrene adduct is 43.5 percent. Infra-red and NMR spectra, together with elemental analysis confirm a spiro-lactone structure and confirm that the product is the result of the combination of 2 moles of dichloroketene with 1 mole of styrene. Such analytical procedures indicate the presence of two isomers which may be named (a) 1,1,7,7-tetrachloro-3-oxa-6-phenyl Spiro[3.3]heptane-2-one and (b) 1,1,5,5-tetrachloro-3-oxa-7-phenyl Spiro[3.3]heptane-2-one and, therefore, are believed to be represented by the following structural formulae:

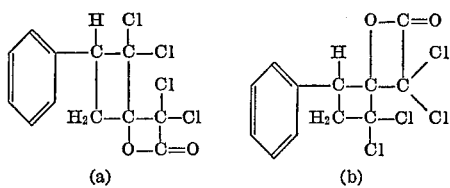

Isomer (a) is believed to be the predominant isomer of the two.

EXAMPLE VI

A portion (5.5 grams) of the 2:1 dichloroketene:styrene adduct product of Example V was dissolved in a large excess of absolute ethyl alcohol and the solution shaken violently. The solution was permitted to stand at room temperature for two days and any solid which formed was separated therefrom by filtering. Thereafter, the solution was evaporated at room temperature using a rotary film evaporator, water aspirator and warm water bath. The liquid residue from this evaporation was an orange colored liquid which had a carbon, hydrogen, and chlorine analysis corresponding closely to the beta-ethoxy carboxylic acid which would be obtained by alcoholysis of the corresponding beta-lactone.. Found: Cl, 39.6 percent; C, 44.9 percent; H, 3.6 percent. Calculated: Cl, 38.2 percent; C, 45.1 percent; H, 3.8 percent. The infra-red spectrum of this material was that which would be expected for a beta-ethoxy carboxylic acid.

EXAMPLE VII

Alpha,alpha-dichloro-beta-methyl - beta - propiolactone from Example I was distilled under reduced pressure (0.1 mm. Hg) and 20.5 grams of the distillate was slowly added to a well-stirred excess of distilled water at room temperature. The mixture was permitted to stand for about 24 hours and then warmed gradually to about 40° C. with stirring until a single liquid phase system was obtained. The solution was filtered and then evaporated to dryness under reduced pressure of about 12 mm. Hg. The evaporation residue was slurried in benzene and filtered. The benzene washed residue was dried under a reduced pressure of about 12 mm. Hg. Analysis of the dried product showed it to be alpha,alpha-dichloro-beta-hydroxy butyric acid. A summary of the hydrolysis data appears in Table I.

TABLE I

| | | |
|---|---|---|
| Lactone hydrolyzed | grams | 20.5 |
| Water for hydrolysis | do | 50.0 |
| Hydrolysis temperature | ° C. | 40 |
| Hydrolysis time | hours | 24 |
| Acid product | grams | 19.0 |
| Acid yield | percent | 83.0 |
| Found chlorine content of acid | do | 40.9 |
| Calculated chlorine content of acid | do | 41.0 |
| Melting point of acid | ° C. | 118–119 |
| Found carbon content of acid | percent | 27.8 |
| Calculated carbon content of acid | do | 27.7 |
| Found hydrogen content of acid | do | 3.55 |
| Calculated hydrogen content of acid | do | 3.47 |

EXAMPLE VIII

The sodium salt of the alpha,alpha-dichloro-beta-hydroxy butyric acid of Example VII was prepared and tested for herbicidal activity. The results of such testing indicated some activity toward pigweed.

EXAMPLE IX

A suitable reaction flask is charged with 31 grams (0.2 mole) of alpha,alpha-dichloro-beta-methyl-beta - propiolactone dissolved in benzene together with a catalytic amount of potassium carbonate. The flask is purged with nitrogen, sealed and heated to about 80–85° C. until polymerization is complete. The polymerized product is purified and applied as a thin film to a test tin plate by a draw-down rod to obtain a thin coating.

EXAMPLE X

The procedure of Example IX is repeated with the lactone products prepared by separately reacting 1 mole of dichloroketene with 1 mole each of propionaldehyde, benzaldehyde, cyclohexanone, and 2-butanone, and similar coatings are obtained.

EXAMPLE XI

A suitable reaction flask is charged with 15 moles of alpha,alpha-dichloro-beta-propiolactone that is prepared by reacting an equimolar amount of dichloroketene and formaldehyde, 1 mole of ethylene glycol, and about 5 liters of cyclohexane as solvent. About 2 grams of potassium carbonate, as catalyst, is also introduced into the reaction flask and the reaction mixture agitated while the temperature is raised over a period of about 4 hours from room temperature (about 23° C.) to reflux temperature. The reaction mixture is refluxed for about 12 hours and then filtered hot to remove the catalyst. The filtrate is stripped to remove the solvent. A residue in the form of a viscous oil is recovered. The residue product is found to be a hydroxyl-terminated polyester having the repeating unit structure:

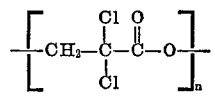

wherein $n$ is about 14. The molecular weight of the polyester is found to be about 2000.

Approximately an equimolar amount of tolylene diisocyanate and the hydroxyl-terminated polyester prepared above are reacted to form urethane rubber prepolymer. This product is then chain extended by reaction with a catalytic amount of triethylene diamine and the resultant elastomeric-like product cured by conventional sulfur cure recipe. The final cured product is typical of urethane elastomeric compositions.

EXAMPLE XII

The procedures of Example XI are repeated successively with the beta-lactones prepared from the reaction of equimolar amounts of dichloroketene and acetaldehyde, dichloroketene and propionaldehyde, dichloroketene and butyraldehyde and dichloroketene and benzaldehyde and similar urethane elastomeric compositions are produced.

EXAMPLE XIII

About 25 grams of alpha,alpha-dichloro-beta-methyl-propiolactone monomer prepared by the reaction of an equimolar amount of dichloroketene and acetaldehyde is charged into a suitable reactor maintained at a temperature of about 0° C. About 0.01 gram of betaine $$[(CH_3)_3N^+—CH_2COO^-]$$

is added to the reactor and the monomer permitted to react under anhydrous conditions for a period of about 72 hours. A powdery product in an amount of about 19 grams that is the polymer of the propiolactone monomer is recovered. The polymer product is dissolved in methylene chloride and applied as a coating in the form of a thin film to a test tin plate by a draw-down rod. The film exhibits flame and water resistance.

EXAMPLE XIV

In accordance with the procedures described in Example XIII, beta-lactone polymers are prepared from the products resulting from the reaction of 2 moles of dichloroketene with 1 mole of vinyl ethyl ether, styrene, and dihydropyran, respectively. Flame and water-resistant coatings are obtained from each of the polymers prepared.

While there are above described a number of specific embodiments of the present invention, it is obviously possible to produce other embodiments and various equivalent modifications thereof without departing from the spirit of the present invention.

Having set forth the general nature and specific embodiments of the present invention, the true scope is now more particularly pointed out in the appended claims.

We claim:

1. An alpha,alpha-dichloro-beta-lactone or isomer thereof represented by one of the following formulae:

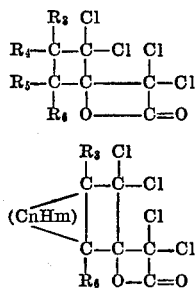

and

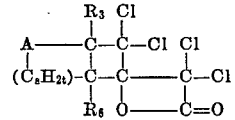

wherein:

$R_3$, $R_5$ and $R_6$ are hydrogen and $R_4$ is selected from the group consisting of $C_1$–$C_{20}$ alkyl, $C_1$–$C_{20}$ halogenated alkyl, $C_6$–$C_9$ hydrocarbon aryl, halo-substituted C–$C_9$ hydrocarbon aryl, $C_1$–$C_4$ alkoxy, $n$ is a cardinal number of from 2 to 5, $m$ is equal to $2n$ or $2n-2$, A is oxygen or methylene, $s$ is a cardinal number of from 1 to 5, and $t$ is equal to $2s$ or $2s-2$.

2. An alpha,alpha-dichloro-beta-lactone or isomer thereof represented by one of the following formulae:

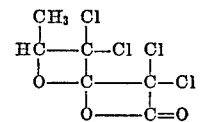

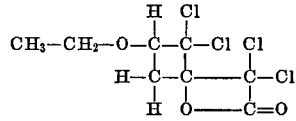

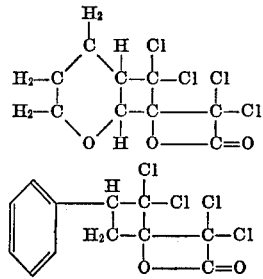

References Cited

UNITED STATES PATENTS

| | | | |
|---|---|---|---|
| 2,450,117 | 9/1948 | Caldwell | 260—344 |
| 2,466,420 | 4/1949 | Hagemeyer | 260—344 |
| 2,853,474 | 9/1958 | Reynolds et al. | 260—535 X |
| 3,056,802 | 10/1962 | Phillips et al. | 260—343 |

OTHER REFERENCES

Noller, Chemistry of Organic Compounds (1965) p. 836.

ALEX MAZEL, Primary Examiner

J. A. NARCAVAGE, Assistant Examiner

U.S. Cl. X.R.

71—110; 252—8.1; 260—77.5 AN, 78.3 R, 535 H, 539 R